US012475818B2

(12) United States Patent
Zou et al.

(10) Patent No.: US 12,475,818 B2
(45) Date of Patent: Nov. 18, 2025

(54) DISPLAY APPARATUS, ELECTRONIC DEVICE, AND VEHICLE

(71) Applicant: SHENZHEN YINWANG INTELLIGENT TECHNOLOGIES CO., LTD., Shenzhen (CN)

(72) Inventors: Bing Zou, Shenzhen (CN); Lei Mao, Shenzhen (CN); Xiao Li, Gongguan (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/678,119

(22) Filed: May 30, 2024

(65) Prior Publication Data
US 2024/0321151 A1    Sep. 26, 2024

Related U.S. Application Data

(63) Continuation of application No. PCT/CN2022/119145, filed on Sep. 15, 2022.

(30) Foreign Application Priority Data
Nov. 30, 2021    (CN) .......................... 202111447555.7

(51) Int. Cl.
   *G09G 3/00* (2006.01)
   *B60K 35/235* (2024.01)
   (Continued)

(52) U.S. Cl.
   CPC .......... *G09G 3/001* (2013.01); *B60K 35/235* (2024.01); *G02B 27/0025* (2013.01);
   (Continued)

(58) Field of Classification Search
   CPC .............. G09G 3/001; G09G 2354/00; G09G 2380/10; B60K 35/235; B60K 2360/23;
   (Continued)

(56) References Cited

U.S. PATENT DOCUMENTS

| 6,097,353 A | 8/2000 | Melville et al. |
| 6,535,183 B2 | 3/2003 | Melville et al. |

(Continued)

FOREIGN PATENT DOCUMENTS

| CN | 107845083 A | 3/2018 |
| CN | 108415157 A | 8/2018 |

(Continued)

OTHER PUBLICATIONS

European Search Report in European Appln. No. 22900036.9, mailed on Feb. 13, 2025, 8 pages.

(Continued)

*Primary Examiner* — Brent D Castiaux
(74) *Attorney, Agent, or Firm* — Fish & Richardson P.C.

(57) ABSTRACT

The present disclosure relates to apparatuses for display. An example display apparatus includes a picture generation unit, an imaging reflector, a detection unit, and at least one processor. The picture generation unit is configured to generate an image, and send image light of the image to the imaging reflector. The imaging reflector is configured to reflect the image light to generate a virtual image of the image. The detection unit is configured to collect first signal light transmitted through the imaging reflector, where the first signal light is light reflected by an eye of a user viewing the virtual image. The at least one processor is configured to determine a location of the eye of the user based on the first signal light collected by the detection unit, where a propagation direction of the image light reflected by the imaging reflector is parallel to a propagation direction of the first signal light.

20 Claims, 11 Drawing Sheets

(51) Int. Cl.
*G02B 27/00* (2006.01)
*G02B 27/01* (2006.01)
*G02B 27/28* (2006.01)

(52) U.S. Cl.
CPC ..... *G02B 27/0093* (2013.01); *G02B 27/0101* (2013.01); *G02B 27/283* (2013.01); *B60K 2360/23* (2024.01); *B60K 2360/31* (2024.01); *G02B 2027/011* (2013.01); *G02B 2027/0138* (2013.01); *G02B 2027/014* (2013.01); *G09G 2354/00* (2013.01); *G09G 2380/10* (2013.01)

(58) Field of Classification Search
CPC ............ B60K 2360/31; G02B 27/0025; G02B 27/0093; G02B 27/0101; G02B 27/283; G02B 27/00; G02B 27/01; G02B 2027/011; G02B 2027/0138; G02B 2027/014; G09F 19/16; G09F 21/049; G09F 9/30; G09F 27/005
See application file for complete search history.

(56) References Cited

U.S. PATENT DOCUMENTS

| | | | |
|---|---|---|---|
| 10,429,927 B1* | 10/2019 | Sharma | G06F 3/0346 |
| 2010/0067118 A1* | 3/2010 | Takahashi | G02B 27/01 |
| | | | 359/633 |
| 2011/0227717 A1* | 9/2011 | Kumon | G02B 27/01 |
| | | | 340/441 |
| 2016/0004302 A1* | 1/2016 | Bolle | G06F 3/013 |
| | | | 348/14.08 |
| 2020/0124862 A1 | 4/2020 | Lambert et al. | |
| 2020/0143184 A1 | 5/2020 | Naradikian | |
| 2020/0333596 A1* | 10/2020 | Yoon | G02B 5/3025 |
| 2023/0054971 A1* | 2/2023 | Hada | B60K 35/28 |

FOREIGN PATENT DOCUMENTS

| | | |
|---|---|---|
| CN | 109618029 A | 4/2019 |
| JP | 2009163084 A | 7/2009 |
| JP | 2021119065 A | 8/2021 |
| WO | WO2021172333 A1 * | 9/2021 |

OTHER PUBLICATIONS

Office Action in Japanese Appln. No. 2024-532310, mailed on Jun. 9, 2025, 10 pages (with English translation).

* cited by examiner

Image light ··········
First signal light ──────

DISPLAY APPARATUS, ELECTRONIC DEVICE, AND VEHICLE

CROSS-REFERENCE TO RELATED APPLICATIONS

This application is a continuation of International Application No. PCT/CN2022/119145, filed on Sep. 15, 2022, which claims priority to Chinese Patent Application No. 202111447555.7, filed on Nov. 30, 2021. The disclosures of the aforementioned applications are hereby incorporated by reference in their entireties.

TECHNICAL FIELD

This application relates to the field of image display, and in particular, to a display apparatus, an electronic device, and a vehicle.

BACKGROUND

Currently, a display apparatus with a virtual imaging function is widely used in fields such as augmented reality (AR) and entertainment display, because the display apparatus can generate a long-distance and enlarged virtual image for a to-be-displayed real image, to enable a user to experience a more realistic viewing effect and a stronger sense of immersion. To improve experience of the user viewing the virtual image, an eye detection apparatus is usually used to detect an eye of the user, so that a generated image can match a location of the eye of the user, to reduce distortion of the virtual image and present a good virtual image. However, currently, the display apparatus with the virtual imaging function lacks an effective technical means for accurately detecting the location of the eye of the user when the user views the virtual image displayed by the display apparatus.

SUMMARY

Embodiments of this application provide a display apparatus, an electronic device, and a vehicle, to accurately detect a location of an eye of a user viewing a virtual image displayed by the display apparatus.

According to a first aspect, an embodiment of this application provides a display apparatus, including a picture generation unit, an imaging reflector, a detection unit, and a processing unit. The detection unit is deployed on a rear side of the imaging reflector. The picture generation unit is configured to generate an image, and send image light of the image to the imaging reflector. The imaging reflector is configured to reflect the image light to generate a virtual image of the image. The detection unit is configured to collect first signal light transmitted through the imaging reflector, where the first signal light is light reflected by an eye of a user viewing the virtual image. The processing unit is configured to determine a location of the eye of the user based on the first signal light collected by the detection unit. A propagation direction of the image light reflected by the imaging reflector is parallel to a propagation direction of the first signal light.

According to the display apparatus provided in the first aspect, the detection unit is deployed on the rear side of the imaging reflector, so that the propagation direction of the image light reflected by the imaging reflector is parallel to the propagation direction of the first signal light received by a detector. Therefore, the first signal light can accurately reflect the location of the eye of the user viewing the virtual image, and the processing unit can obtain an accurate location of the eye based on the first signal light.

Optionally, the imaging reflector is configured to reflect visible light and transmit invisible light, where the image light is visible light, and the first signal light is invisible light; or the imaging reflector is configured to reflect first polarized light and transmit second polarized light, where polarization directions of the first polarized light and the second polarized light are perpendicular to each other, the image light is the first polarized light, and the first signal light is the second polarized light.

The imaging reflector can reflect visible light and transmit invisible light, or can reflect the first polarized light and transmit the second polarized light. Based on this, through the setting of the image light as visible light and the first signal light as invisible light or the setting of the image light as the first polarized light and the first signal light as the second polarized light, reflection of the image light and transmission of the first signal light by the imaging reflector can be realized.

In a possible implementation, a curvature of a front surface of the imaging reflector is consistent with a curvature of a rear surface of the imaging reflector, to reduce aberration and distortion introduced during light transmission.

In another possible implementation, a curvature of a front surface of the imaging reflector is inconsistent with a curvature of a rear surface of the imaging reflector. According to the display apparatus provided in this implementation, the curvature of the front surface of the imaging reflector may not be required to be consistent with the curvature of the rear surface of the imaging reflector, but instead, an image formed by the first signal light transmitted through the imaging reflector is corrected using an algorithm, or a lens is additionally provided for light compensation.

Optionally, the display apparatus further includes a lens. The lens is deployed between the imaging reflector and the detection unit. The lens is configured to perform light compensation on the first signal light transmitted through the imaging reflector, and transmit the first signal light after the light compensation to the detection unit.

When the curvatures of the front surface and the rear surface of the imaging reflector are inconsistent, the lens may compensate for the first signal light transmitted through the imaging reflector, to correct the image formed by the first signal light.

In a possible implementation, the detection unit is deployed on a connecting line between an observation location and the virtual image generated by the imaging reflector, and the observation location is the location of the eye of the user viewing the virtual image.

According to the display apparatus provided in this implementation, a requirement on a field of view range of a lens assembly of the detection unit may be lowered.

In a possible implementation, the connecting line is perpendicular to the virtual image and passes through a center of the virtual image.

According to the display apparatus provided in this implementation, it can be ensured that a detection apparatus is aligned with lines of sight of two eyes of the user, to facilitate measurement of a gaze angle of the user viewing the virtual image, and the requirement on the field of view of the lens assembly of the detection unit can further be lowered, thereby reducing costs of the display apparatus.

In a possible implementation, the processing unit is further configured to generate image correction information based on the first signal light collected by the detection unit, and send the image correction information to the picture generation unit; and the picture generation unit is further configured to adjust the generated image based on the image correction information.

According to the display apparatus provided in this implementation, the virtual image generated by the imaging reflector can match the location of the eye and/or a gaze direction of the user, to improve viewing experience of the user.

In a possible implementation, the imaging reflector is a display window.

The display apparatus provided in this implementation allows the user to directly view the virtual image through the imaging reflector, and is applicable to a common display such as a desktop display (a display of a computer, a television, or the like).

In a possible implementation, the image light reflected by the imaging reflector is reflected by a transparent reflector, to form the virtual image of the image.

According to the display apparatus provided in this implementation, the imaging reflector reflects the image light to the transparent reflector, so that the user views the virtual image through the transparent reflector. This is applicable to a scenario in which the imaging reflector is not used as a display screen, for example, a head-up display (HUD) scenario.

In a possible implementation, the transparent reflector is a front windshield of a vehicle.

According to the display apparatus provided in this implementation, the display apparatus may be used in a vehicle, to implement head-up display on a front windshield of the vehicle.

According to a second aspect, an embodiment of this application provides an electronic device, including the display apparatus provided in the first aspect. For a specific structure and beneficial effects of the electronic device, refer to the first aspect and the possible implementations of the first aspect. Details are not described herein again.

According to a third aspect, this application further provides a vehicle, including the display apparatus according to the first aspect.

DESCRIPTION OF EMBODIMENTS

This application provides a display apparatus, an electronic device, and a vehicle. The display apparatus may be used as a common display (for example, denoted by 100a in FIG. 1a) for office use, as a television (for example, denoted by 100b in FIG. 1b) for family entertainment, as an in-vehicle display (for example, denoted by 100c in FIG. 1c, where the display apparatus is installed at a seat back or a front passenger seat of a vehicle), or as a HUD apparatus on a vehicle (as shown in FIG. 1d). A physical size, a display size, and resolution of the display apparatus may be adjusted according to an application scenario.

In this application, the display apparatus may also be referred to as a display system or a virtual image display apparatus. Units or modules included in the display apparatus may be referred to as components or mechanisms.

The display apparatus provided in this application has a virtual imaging function and can generate a long-distance and enlarged virtual image for a to-be-displayed real image. Compared with displaying using a conventional display screen not having a virtual imaging function or projected displaying using a projection screen, the display apparatus with a virtual imaging function enables a user to experience a more realistic viewing effect and a stronger sense of immersion. However, different from the conventional display screen or the projection screen, the display apparatus with a virtual imaging function does not have a diffusion function to cause a light beam to leave the screen at a large range of angles. In other words, an effective viewing area of the display apparatus with a virtual imaging function is limited and the light beam can only be received by eyes of users in a small angle range. In addition, even for a user viewing the virtual image in the effective viewing area, dynamic distortion occurs as the viewing position changes. Therefore, an eye detection apparatus needs to be used to detect a location of the eye.

Figure 2A:
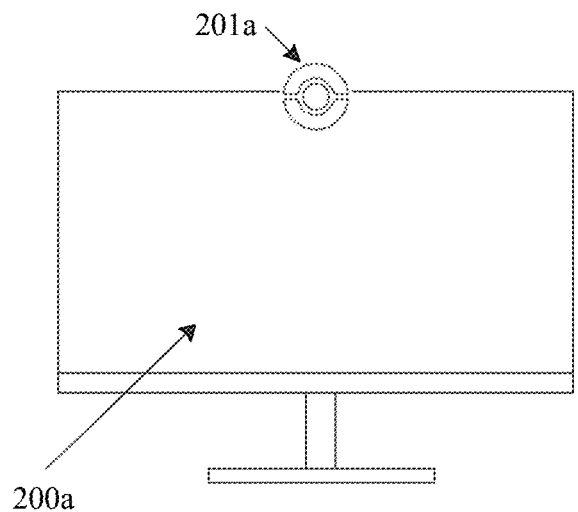
FIG. 2a is a schematic diagram of an eye detection apparatus in a display apparatus according to an embodiment of this application.

Generally, the eye detection apparatus may be deployed on a frame of the display apparatus. For example, an eye detection apparatus (such as a camera) 201a shown in FIG. 2a is deployed on a frame of a display 200a. Alternatively, the eye detection apparatus may be integrated inside the display apparatus. For example, an eye detection apparatus 201b shown in FIG. 2b is deployed in a display apparatus 200b.

Figure 2B:
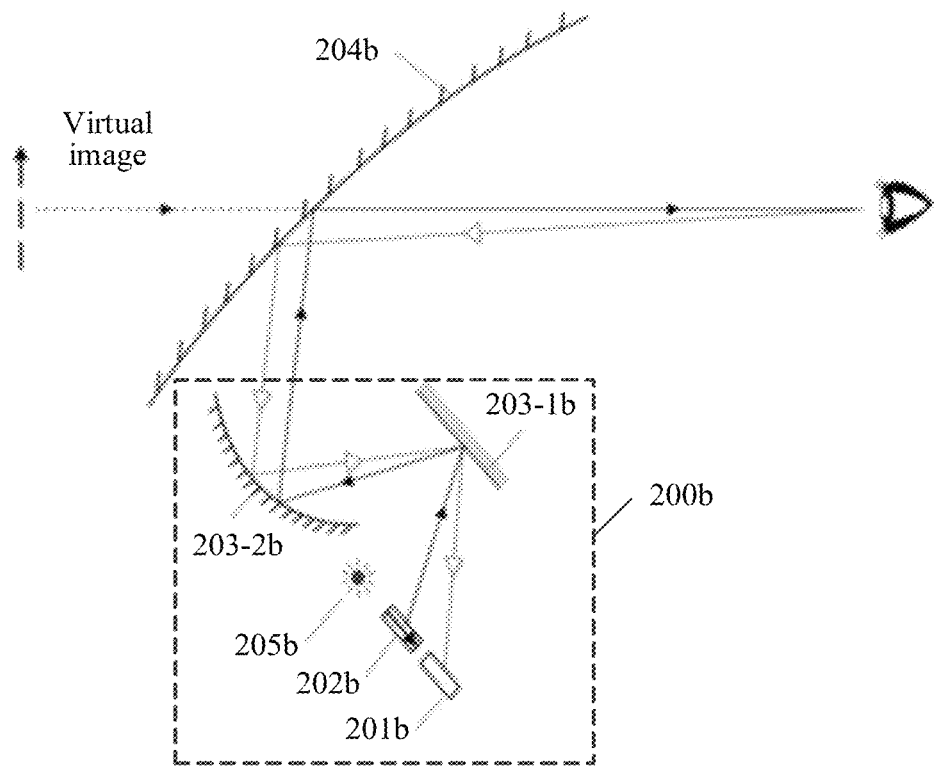
FIG. 2b is a schematic diagram of an eye detection apparatus in another display apparatus according to an embodiment of this application.

With reference to FIG. 2b, an image source 202b emits image light. After being reflected by reflection components (203-1b and 203-2b), the image light is reflected by a windshield 204b to an eye, to form a virtual image. In addition, an infrared light source 205b in the display apparatus 200b is used to illuminate the eye. Then, the eye detection apparatus 201b detects an optical signal reflected back from the eye. The display apparatus 200b determines a location of the eye based on the detected optical signal. However, because an optical path of the image light is not parallel to an optical path of the optical signal, the optical signal cannot accurately reflect the location of the eye of the user viewing the virtual image.

To resolve the foregoing technical problems, the display apparatus provided in embodiments of this application can accurately detect a location of an eye.

The following describes in detail the display apparatus provided in embodiments of this application with reference to the accompanying drawings.

Figure 3A:
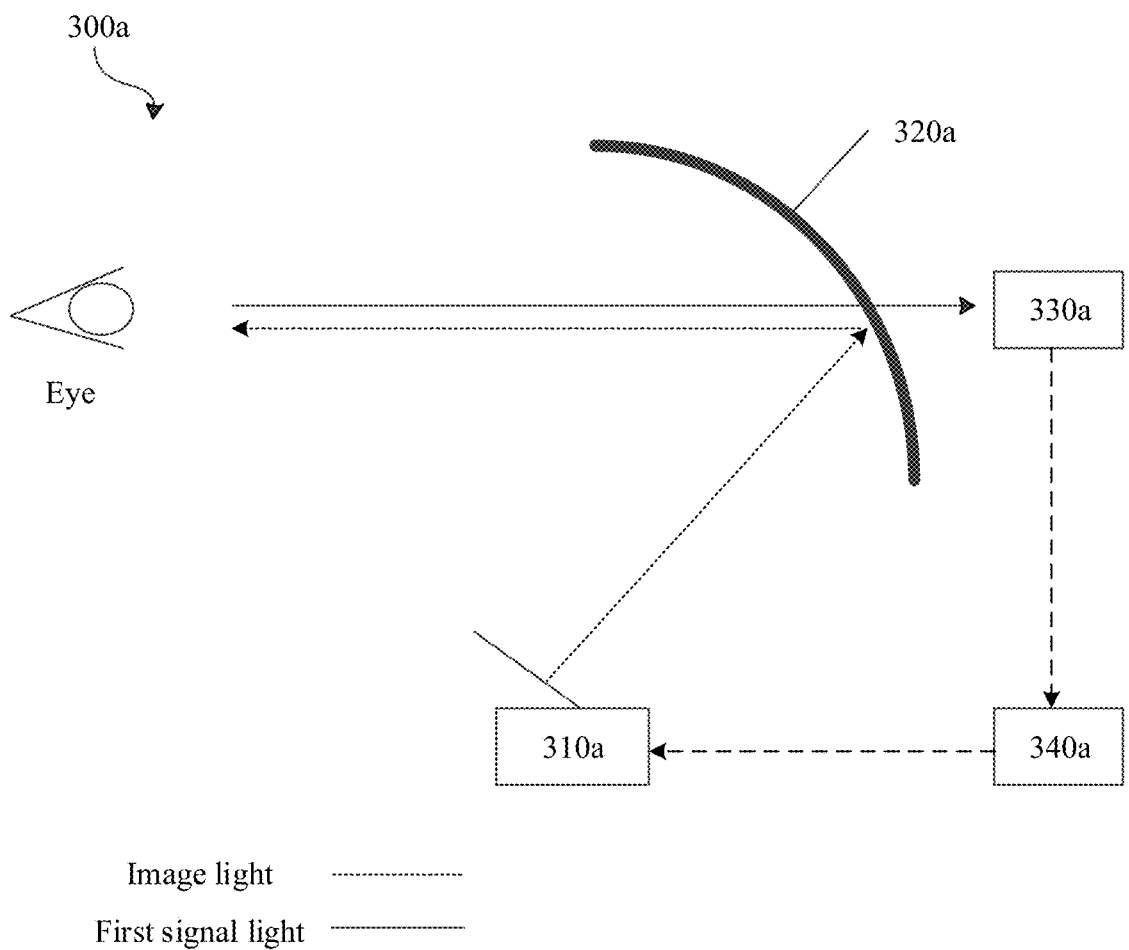
FIG. 3a is a schematic diagram of a structure of a display apparatus 300a according to an embodiment of this application.

Refer to FIG. 3a. FIG. 3a is a schematic diagram of a structure of a display apparatus 300a according to an embodiment of this application.

As shown in FIG. 3a, the display apparatus 300a includes a picture generation unit (PGU) 310a, an imaging reflector 320a, a detection unit 330a, and a processing unit 340a. The picture generation unit 310a is configured to generate an image, and project image light of the image to the imaging reflector 320a. The imaging reflector 320a is configured to reflect the received image light to generate a virtual image of the image. The imaging reflector 330a is further configured to transmit first signal light, where the first signal light is light reflected by an eye of a user viewing the virtual image. The detection unit 330a is configured to collect the first signal light transmitted through the imaging reflector 320a. The processing unit 340a is configured to determine a location of the eye of the user based on the first signal light collected by the detection unit 330a.

It should be noted that the detection unit 330a is deployed on a rear side of the imaging reflector 320a. In this case, referring to FIG. 3a, a propagation direction of the image light reflected by the imaging reflector 330a is parallel to a propagation direction of the first signal light. It should be understood that, in some scenarios, parallel propagation directions may also be expressed as parallel light beams or overlapping light beams.

It should also be understood that, the processing unit 340a may determine the location of the eye of the user and a gaze direction of the user based on the first signal light collected by the detection unit 330a.

Figure 1A:
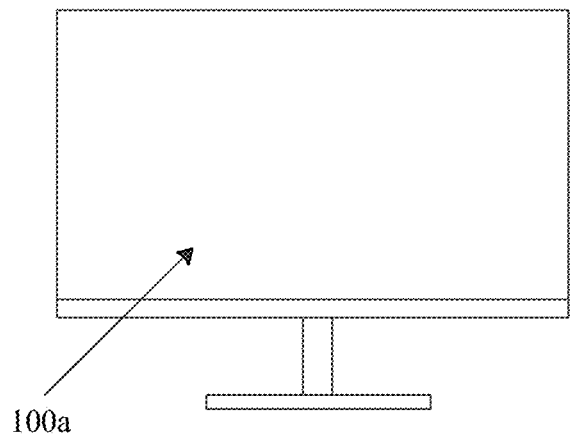
FIG. 1a is a schematic diagram of a display apparatus used as a common display according to this application.
Figure 1B:
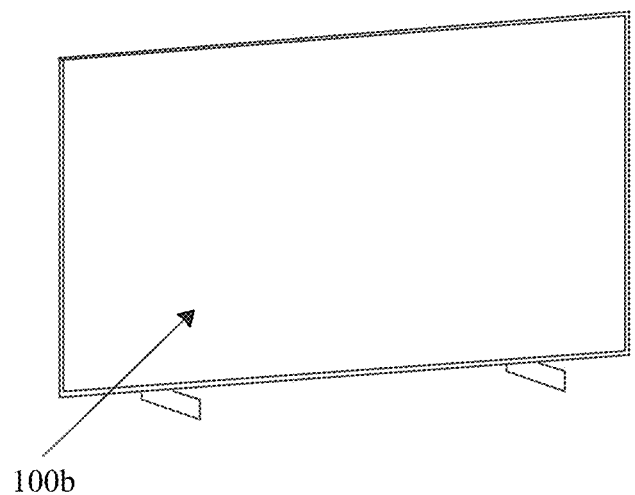
FIG. 1b is a schematic diagram of a display apparatus used as a television according to this application.
Figure 1C:
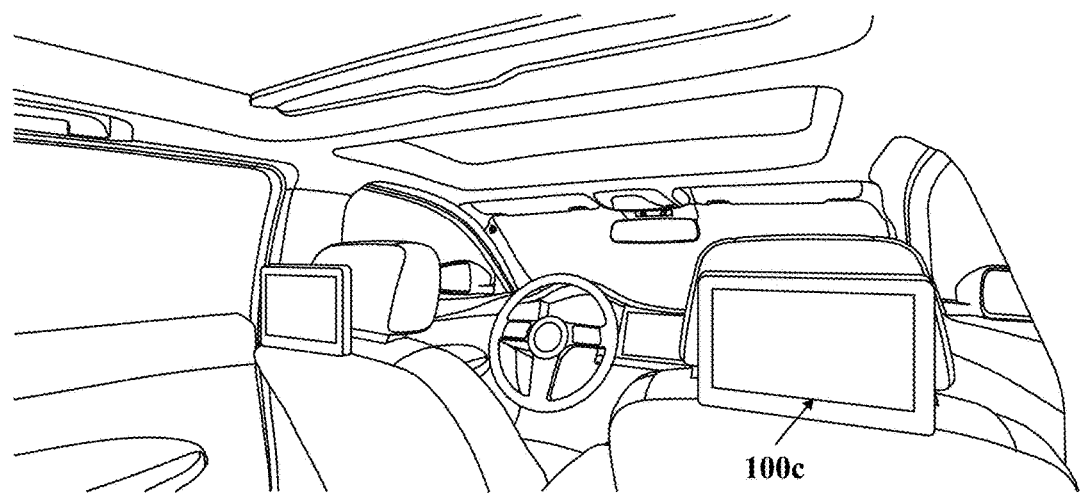
FIG. 1c is a schematic diagram of a display apparatus used as an in-vehicle display according to this application.
Figure 1D:
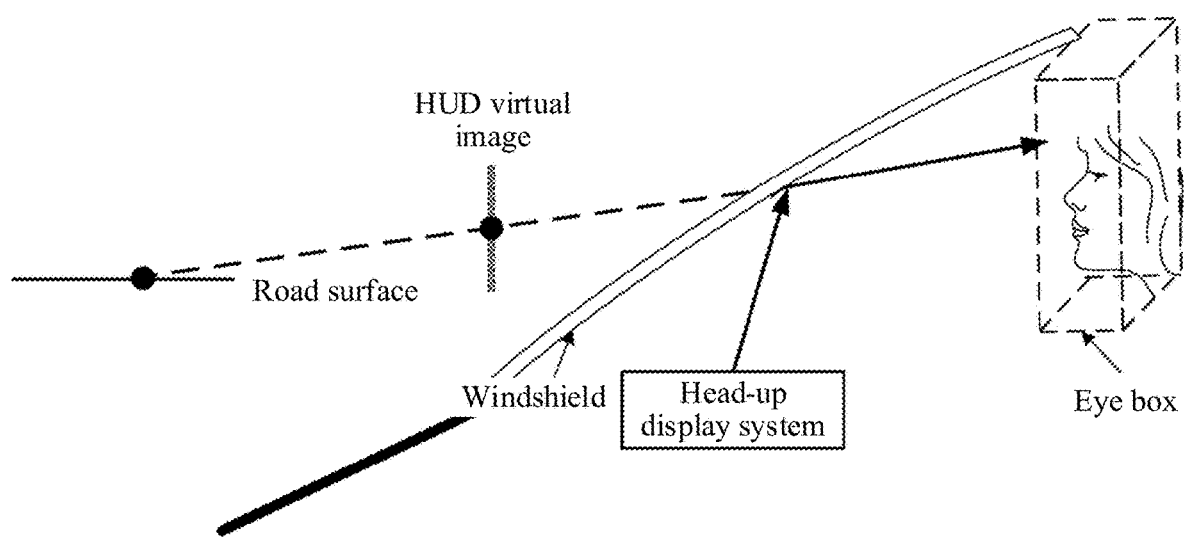
FIG. 1d is a schematic diagram of a head-up display system according to this application.

In FIG. 3a, the display apparatus 300a may be a display or a component in a display, for example, may be the display 100a in FIG. 1a, the display 100b in FIG. 1b, or the display 100c in FIG. 1c. The imaging reflector 330a in the display apparatus 300a shown in FIG. 3a may be a display window. The display window is opposite to the eye of the user viewing the virtual image.

Figure 3B:
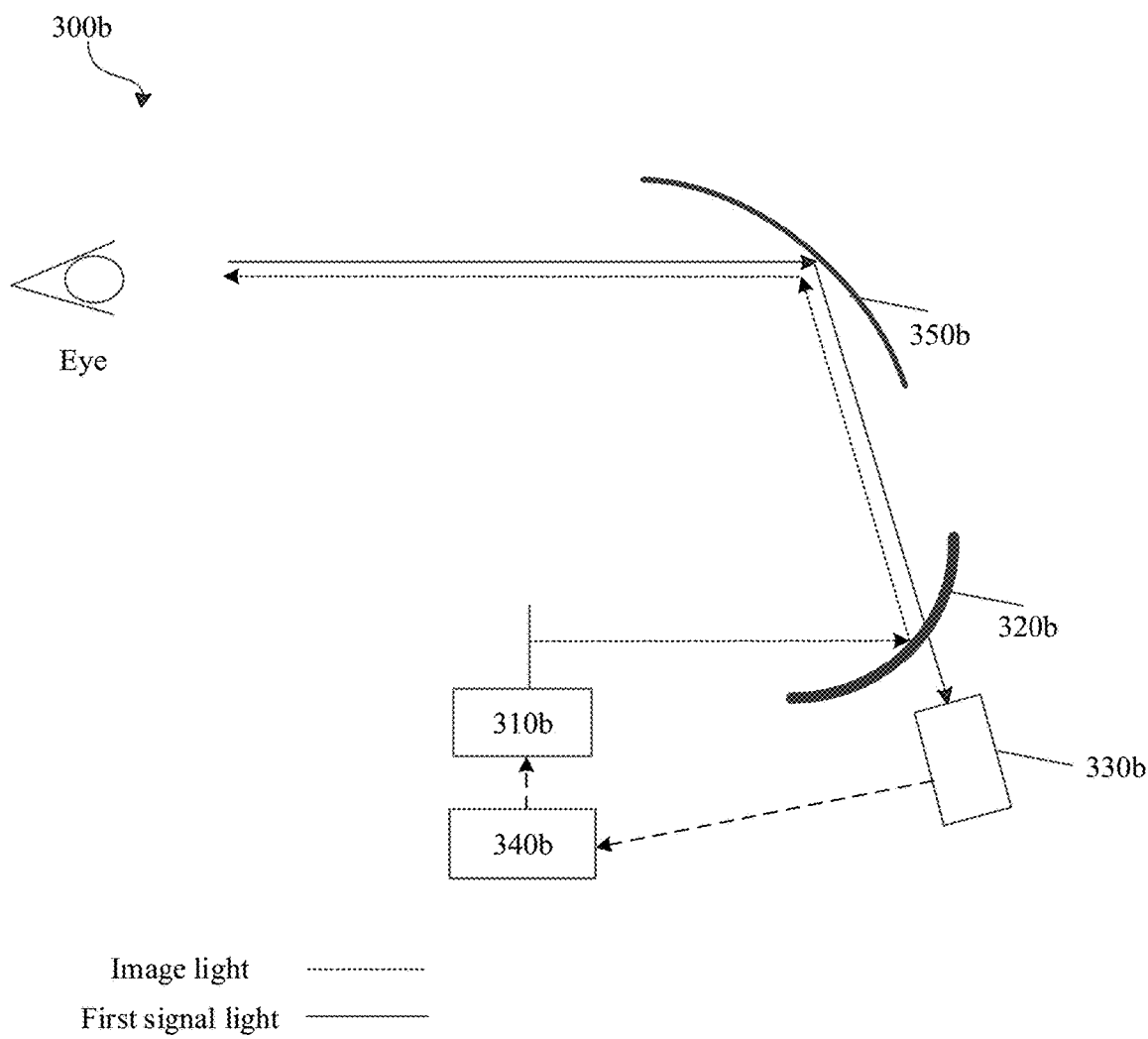
FIG. 3b is a schematic diagram of a structure of a display apparatus 300b according to an embodiment of this application.

Refer to FIG. 3b. FIG. 3b is a schematic diagram of a structure of a display apparatus 300b according to an embodiment of this application.

As shown in FIG. 3b, the display apparatus 300b includes a picture generation unit 310b, an imaging reflector 320b, a detection unit 330b, and a processing unit 340b. Functions implemented by the picture generation unit 310b, the imaging reflector 320b, the detection unit 330b, and the processing unit 340b are the same as those implemented by the picture generation unit 310a, the imaging reflector 320a, the detection unit 330a, and the processing unit 340a, and a position relationship between the detection unit 330b and the imaging reflector 320b is also the same as a position relationship between the detection unit 330a and the imaging reflector 320a. Details are not described herein again.

A difference between the embodiment shown in FIG. 3b and the embodiment shown in FIG. 3a lies in that, the image light reflected by the imaging reflector 320b in FIG. 3b is reflected by a transparent reflector 350b, to form the virtual image of the image. The transparent reflector 350 is opposite to the eye of the user viewing the virtual image.

The transparent reflector 350 may be, for example, a front windshield of a vehicle. When the reflector 350 is the front windshield of the vehicle, the display apparatus 300b may be a HUD apparatus, for example, the HUD apparatus in FIG. 1d.

In the display apparatuses provided in FIG. 3a and FIG. 3b, the detection unit is deployed on the rear side of the imaging reflector, so that the propagation direction of the image light reflected by the imaging reflector is parallel to the propagation direction of the first signal light received by a detector. Therefore, the first signal light can accurately reflect the location of the eye of the user viewing the virtual image, and the processing unit can obtain an accurate location of the eye based on the first signal light.

Figure 4A:
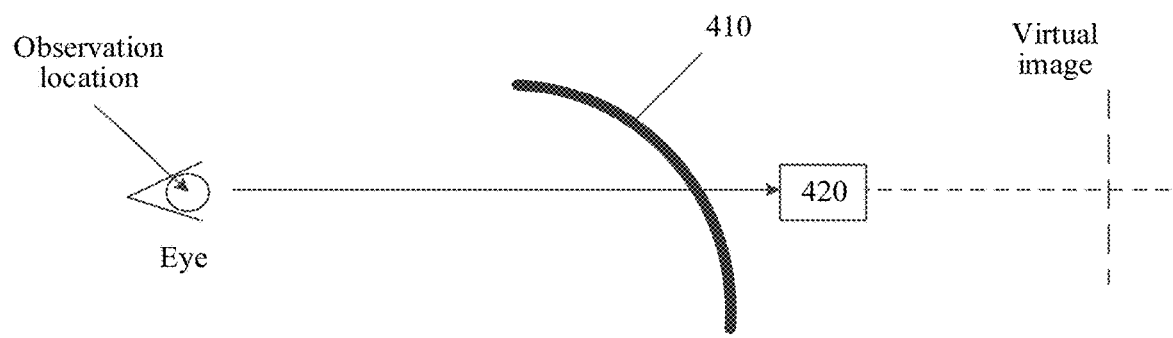
FIG. 4a is a schematic side view of a display apparatus according to this application.
Figure 4B:
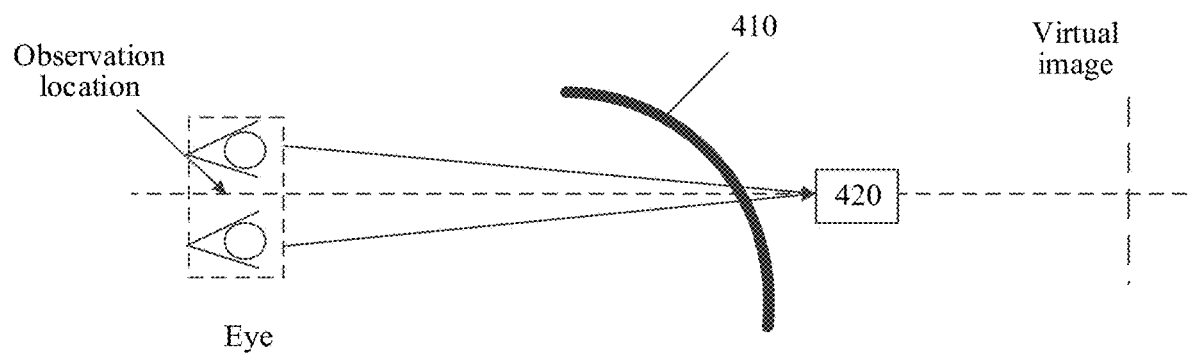
FIG. 4b is a schematic top view of a display apparatus according to this application.

Based on the embodiment shown in FIG. 3a, the detection unit is deployed on the rear side of the imaging reflector, and may be specifically at a position shown in FIG. 4a and FIG. 4b. FIG. 4a is a side view of the display apparatus. FIG. 4b is a top view of the display apparatus. Neither FIG. 4a nor FIG. 4b shows the picture generation unit and the processing unit in the display apparatus.

Refer to FIG. 4a and FIG. 4b. A detection unit 420 (for example, the detection unit 330a in FIG. 3a) is deployed on a rear side of an imaging reflector 410 (for example, the imaging reflector 320a in FIG. 3a), and the detection unit 420 is deployed on a connecting line between an observation location and a virtual image generated by the imaging reflector 410. The observation location is a location of an eye of a user viewing the virtual image. Optionally, the connecting line on which the detection unit 420 is deployed (located) is perpendicular to the virtual image (a plane where the virtual image is located), and passes through a center of the virtual image. Through the deployment of the detection unit 420 on the perpendicular connecting line passing through the center of the virtual image, it can be ensured that the detection unit 420 is aligned with lines of sight of two eyes of the user, to facilitate measurement of a gaze angle of the user viewing the virtual image, and a requirement on a field of view range of a lens assembly of the detection unit 420 can be lowered, thereby reducing costs of the display apparatus.

Figure 5A:
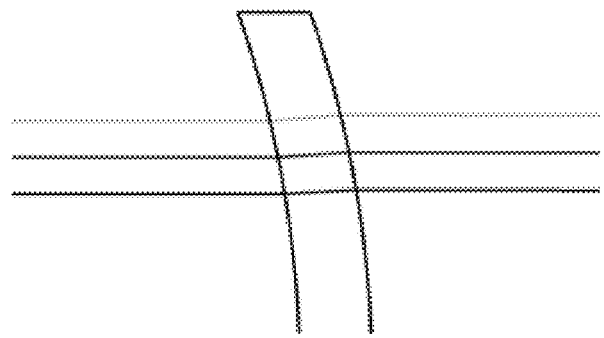
FIG. 5a is a schematic diagram of an imaging reflector according to this application.
Figure 5B:
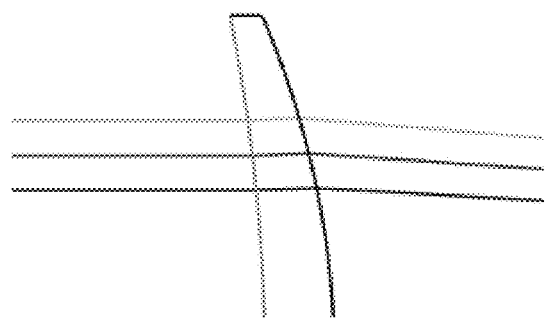
FIG. 5b is a schematic diagram of another imaging reflector according to this application.

The imaging reflector 320a in FIG. 3a may transmit the first signal light to the detection unit 330a. In a process in which the imaging reflector 320a transmits the first signal light, referring to FIG. 5a, if a curvature of a front surface and a curvature of a rear surface of the imaging reflector 320a are consistent, that is, the imaging reflector 320a has a uniform thickness, refraction angles of light rays at different heights in the transmitted first signal light are same, and image quality presented by the first signal light received by the detection unit 330a does not deteriorate or deteriorates within a tolerable range of an image processing algorithm. Referring to FIG. 5b, if the curvature of the front surface and the curvature of the rear surface of the imaging reflector 320a are inconsistent, that is, the imaging reflector 320a has non-uniform thicknesses, refraction angles of light rays at different heights in the transmitted first signal light are different, and image quality of an image formed by the first signal light received by the detection unit 330a severely deteriorates, leading to introduction of aberration and distortion during light transmission of the first signal.

In this case, the curvature of the front surface and the curvature of the rear surface of the imaging reflector deployed on the display apparatus provided in this embodiment (for example, 300a in FIGS. 3a and 300b in FIG. 3b) should be consistent, to reduce aberration and distortion introduced during light transmission.

Figure 6:
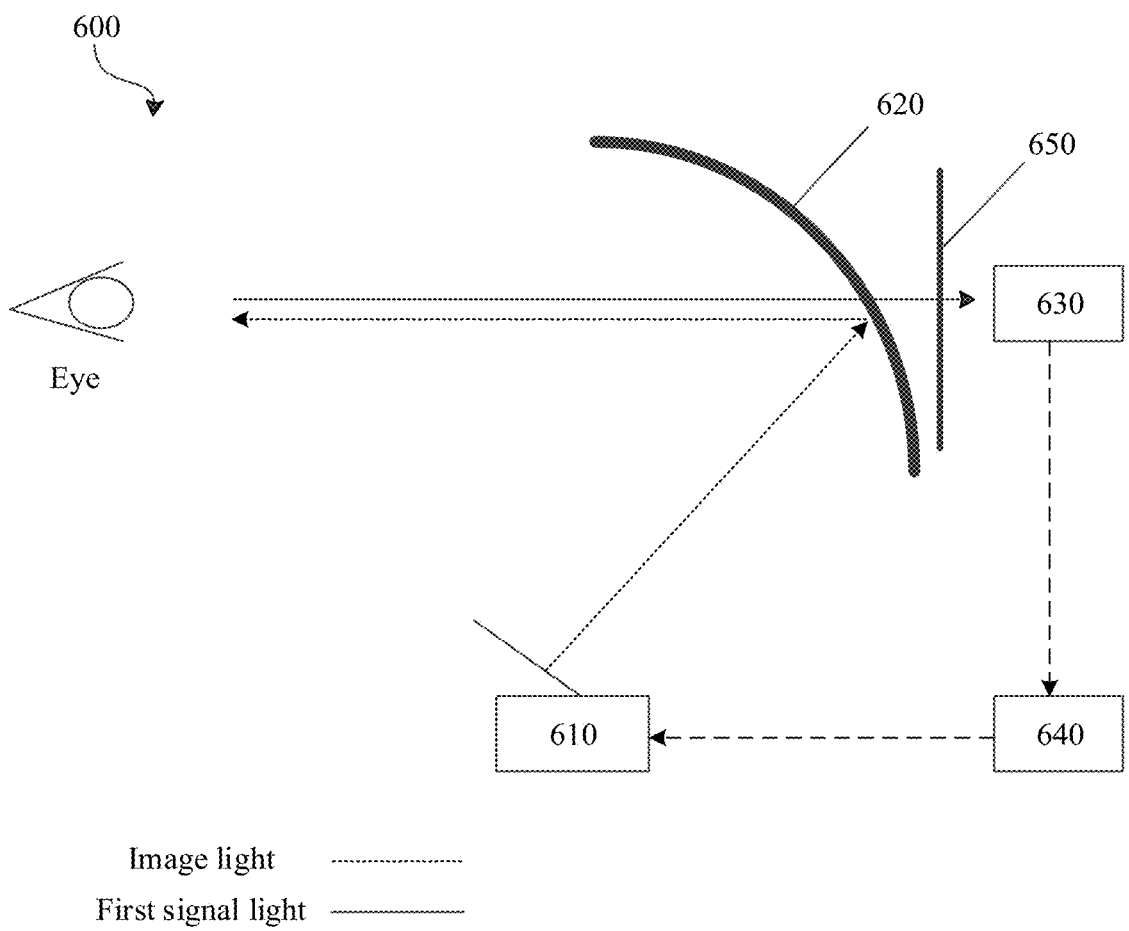
FIG. 6 is a schematic diagram of a structure of a display apparatus 600 according to an embodiment of this application.

In some embodiments, the curvature of the front surface and the curvature of the rear surface of the imaging reflector deployed on the display apparatus provided in this embodiment (for example, 300a in FIGS. 3a and 300b in FIG. 3b) may be inconsistent. When the curvature of the front surface and the curvature of the rear surface of the imaging reflector are inconsistent, the display apparatus provided in this embodiment may be shown in FIG. 6. FIG. 6 is a schematic diagram of a structure of a display apparatus 600 according to an embodiment of this application.

As shown in FIG. 6, the display apparatus 600 includes a picture generation unit 610, an imaging reflector 620, a detection unit 630, a processing unit 640, and a lens 650. Functions implemented by the picture generation unit 610, the imaging reflector 620, the detection unit 630, and the processing unit 640 are the same as those implemented by the picture generation unit 310a, the imaging reflector 320a, the detection unit 330a, and the processing unit 340a, and a position relationship between the detection unit 630 and the imaging reflector 620 is also the same as a position relationship between the detection unit 330a and the imaging reflector 320a. Details are not described herein again.

Figure 7:
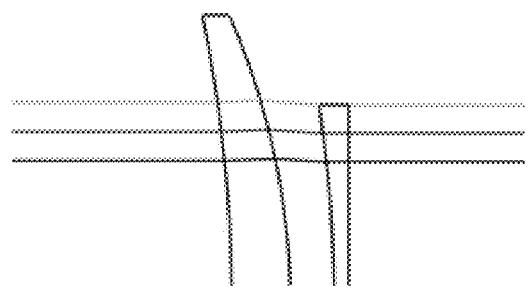
FIG. 7 is a schematic diagram of light compensation according to an embodiment of this application.

The lens 650 is deployed between the imaging reflector 620 and the detection unit 630. The lens 650 is configured to perform light compensation on the first signal light transmitted through the imaging reflector 620, and transmit the first signal light after the light compensation to the detection unit 630. Refer to FIG. 7. A lens (for example, 650 in FIG. 6) may correct light rays of different refraction angles in the first signal light transmitted through the imaging reflector (for example, 620 in FIG. 6) into parallel light rays (parallel light beams).

For example, the imaging reflector is made of an optical glass (N-BK7), and has a front surface curvature radius of 500 mm, a rear surface curvature radius of 250 mm, and a center thickness of 20 mm. A lens having a front surface curvature radius of 460 mm and a center thickness of 5 mm and made of an optical glass (N-BK7) may be additionally provided behind the imaging reflector to correct different refraction angles.

It should be noted that the embodiment shown in FIG. 6 only describes the additional deployment of a lens based on FIG. 3a, but does not constitute any limitation on this application. For example, a lens may also be additionally deployed in FIG. 3b, with a position relationship between the lens, the imaging reflector, and the detection unit being the same as a position relationship between the lens, the imaging reflector, and the detection unit shown in FIG. 6. Details are not described herein again.

Optionally, when the curvature of the front surface and the curvature of the rear surface of the imaging reflector are inconsistent, the detection unit may correct image deterioration by using a software algorithm.

Figure 8:
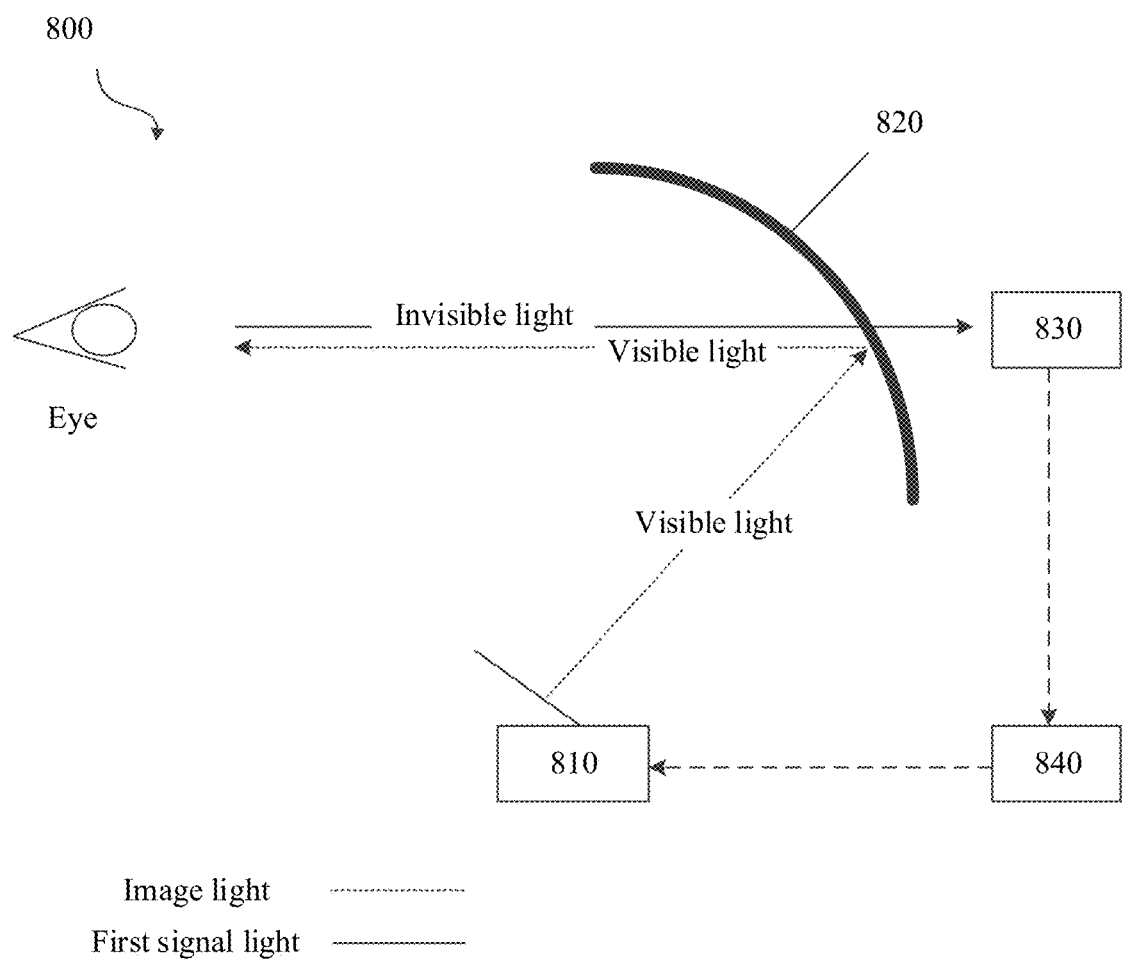
FIG. 8 is a schematic diagram of a structure of a display apparatus 800 according to an embodiment of this application.

FIG. 8 is a schematic diagram of a structure of a display apparatus 800 according to an embodiment of this application.

A display principle of the display apparatus 800 shown in FIG. 8 is the same as that of the display apparatus 300a shown in FIG. 3a. A difference lies in that an imaging reflector 820 in the embodiment of FIG. 8 is specifically configured to reflect visible light and transmit invisible light. Functions of a picture generation unit 810, a detection unit 830, and a processing unit 840 are respectively the same as those of the picture generation unit 310a, the detection unit 330a, and the processing unit 340a, and a position relationship between the detection unit 830 and the imaging reflector 820 is also the same as a position relationship between the detection unit 330a and the imaging reflector 320a. Details are not described herein again.

In the embodiment shown in FIG. 8, image light sent by the picture generation unit 810 to the imaging reflector 820 is visible light, and the imaging reflector 820 may reflect the image light, so that a user views a virtual image of an image generated by the picture generation unit 810. First signal light reflected by the eye of the user viewing the virtual image is invisible light, and the invisible light may be received by the detection unit 830 after being transmitted through the imaging reflector.

The imaging reflector 820 may be coated with a wavelength-dependent film 821 to, for example, reflect light in a visible light band (400 nm to 700 nm) and transmit light in an invisible light band.

In the display apparatus 800, a light source of the invisible light reflected by the eye of the user viewing the virtual image may be, for example, image light, ambient light, or a pre-deployed light source. Optionally, the pre-deployed light source may be an invisible light source, for example, an infrared light source. The invisible light reflected by the eye of the user viewing the virtual image may be a part of light beams in the light reflected by the eye of the user viewing the virtual image, in other words, the light reflected by the eye of the user viewing the virtual image may further include visible light.

The detection unit 830 may be an invisible light detector, for example, an infrared detector.

Figure 9:
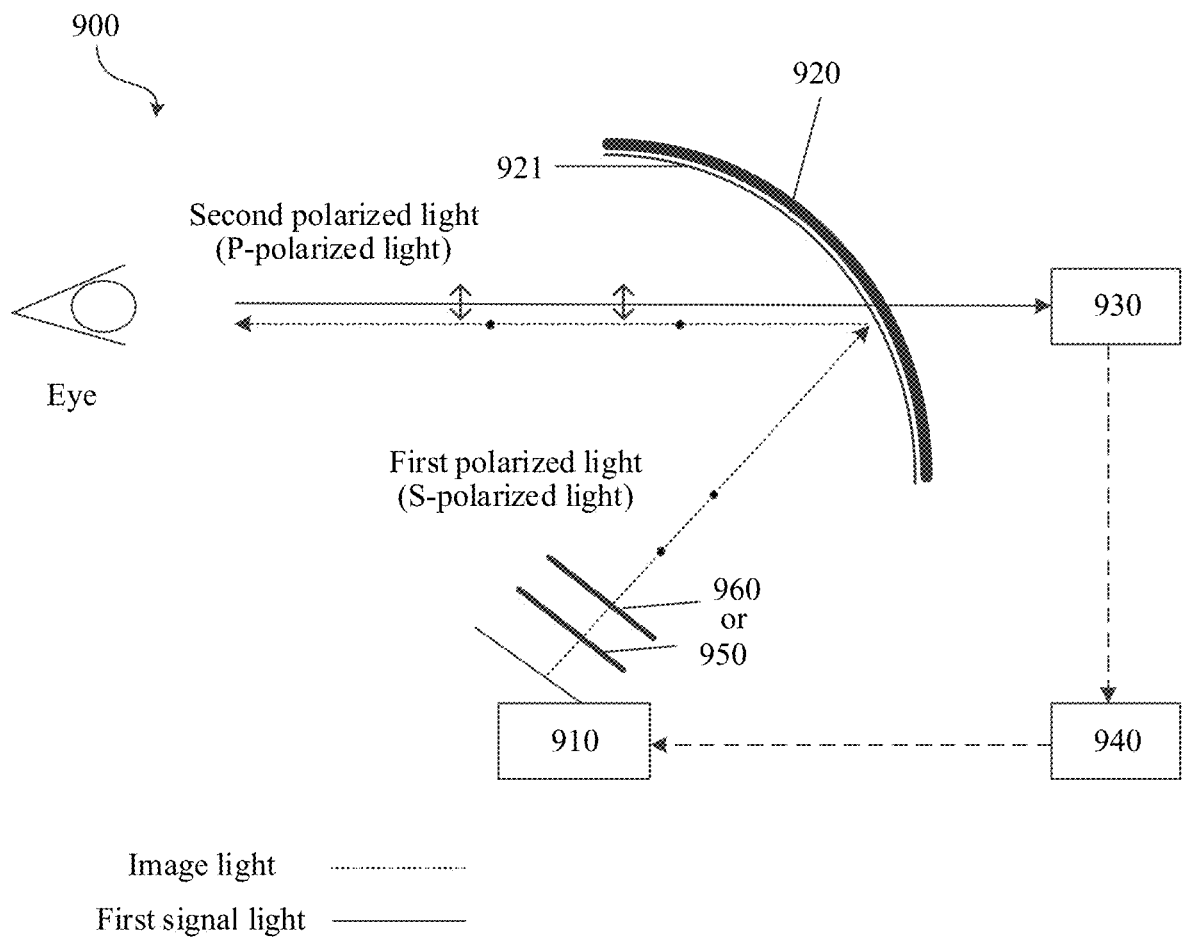
FIG. 9 is a schematic diagram of a structure of a display apparatus 900 according to an embodiment of this application.

FIG. 9 is a schematic diagram of a structure of a display apparatus 900 according to an embodiment of this application.

The display apparatus 900 shown in FIG. 9 is similar to the display apparatus 800 shown in FIG. 8. A difference lies in that an imaging reflector 920 in the embodiment of FIG. 9 is configured to reflect first polarized light (for example, S-polarized light) and transmit second polarized light (for example, P-polarized light), and the imaging reflector 820 in the embodiment of FIG. 8 is configured to reflect visible light and transmit invisible light. Functions of a picture generation unit 910, a detection unit 930, and a processing unit 940 are respectively the same as those of the picture generation unit 310a, the detection unit 330a, and the processing unit 340a, and a position relationship between the detection unit 930 and the imaging reflector 920 is also the same as a position relationship between the detection unit 330a and the imaging reflector 320a. Details are not described herein again.

It should be noted that in this embodiment, an example in which the first polarized light is the S-polarized light and the second polarized light is the P-polarized light is used for description. However, the first polarized light is not limited to the S-polarized light, the second polarized light is not limited to the P-polarized light, and any two beams of polarized light whose polarization directions are perpendicular to each other may be respectively the first polarized light and the second polarized light.

The imaging reflector 920 may be coated with a polarizing film 921 that reflects the S-polarized light and transmits the P-polarized light.

In the display apparatus 900 provided in this embodiment, the image light sent by the picture generation unit 910 to the imaging reflector 920 may be S-polarized light (having a polarization direction perpendicular to paper), and the imaging reflector 920 may reflect the image light, so that the user views a virtual image of an image generated by the picture generation unit 910. P-polarized light (having a polarization direction parallel to paper) in signal light reflected by the eye of the user viewing the virtual image is transmitted through and exits the imaging reflector 920. In this way, the P-polarized light is transmitted to the detection unit 930. Therefore, a propagation direction of the image light reflected by the imaging reflector is parallel to a propagation direction of the first signal light.

A light beam emitted by the picture generation unit 910 may be polarized light. For example, a polarization state of polarized light emitted by picture generation units such as a liquid crystal display (LCD), a liquid crystal on silicon (LCoS)-based display device, and a laser-based laser beam scanning projector may be the same as that of the first polarized light. If the polarization state of the polarized light is different from that of the first polarized light, with reference to FIG. 9, the display apparatus 900 may further include a half-wave plate 950 deployed on an optical path between the picture generation unit 910 and the imaging reflector 920, and is configured to adjust the image light emitted by the picture generation unit 910 into the first polarized light.

Alternatively, a light beam emitted by the picture generation unit 910 may be unpolarized light. For example, when the picture generation unit is a digital light processor (DLP)-based white-light projector, an organic light-emitting diode (OLED) screen, a micro light-emitting diode (Micro-LED) screen, or the like, the display apparatus 900 may further include a polarizer (for example, an S-polarizer). The polarizer 960 is deployed on the optical path between the picture generation unit 910 and the imaging reflector 920, and is configured to convert the image light generated by the picture generation unit 910 into polarized light. In addition, the image light generated by the picture generation unit 910 is adjusted into the first polarized light by controlling a polarization direction of the polarizer 960.

The polarizer may be referred to as a polarizing plate, a polarizing device, a polarization device, a polarizing film, or a polarizer device. For example, the S-polarizer may be referred to as an S-polarizing film.

It should be noted that the embodiments shown in FIG. 8 and FIG. 9 are merely examples described based on the embodiment shown in FIG. 3a, but do not constitute any limitation on this application. For example, the imaging reflector 320b in FIG. 3b may also be configured to reflect visible light and transmit invisible light, or reflect first polarized light and transmit second polarized light. For another example, a half-wave plate or a polarizer may also be deployed on an optical path between the picture generation unit 310b and the imaging reflector 320b in FIG. 3b, to adjust the image light emitted by the picture generation unit 310b into the first polarized light.

For brevity of description, in the following embodiments, only the display apparatus 300a shown in FIG. 3a and components thereof are referenced. However, it should be understood that the example description of the display apparatus 300a shown in FIG. 3a is also applicable to the display apparatus 300b shown in FIG. 3b and components thereof, the display apparatus 600 shown in FIG. 6 and components thereof, the display apparatus 800 shown in FIG. 8 and components thereof, and the display apparatus 900 shown in FIG. 9 and components thereof.

In the display apparatus 300a, a light source of the light reflected by the eye of the user viewing the virtual image may be, for example, image light, ambient light, or a pre-deployed light source. Optionally, the pre-deployed light source may be deployed in the display apparatus 300a, or may be a light source independent of the display apparatus 300a.

In some embodiments, the processing unit 340a may further generate image correction information based on the first signal light collected by the detection unit 330a, and send the image correction information to the picture generation unit 310a, and the picture generation unit 310a adjusts the generated image based on the image correction information.

For example, the detection unit 330a may obtain a face image or a pupil image of the user by receiving the first signal light, and the detection unit 330a sends the obtained face image or pupil image to the processing unit 340a. The processing unit 340a obtains information such as a pupil location and/or a gaze direction of the user through analysis based on the received face image or pupil image. Further, based on the information such as the pupil location and/or the gaze direction of the user, the processing unit 340a determines the image correction information, for example, at least one of a correction value of distortion, an image size, color compensation, and the like. The processing unit 340a may send control information (carrying the image correction information) to the picture generation unit 310a to transfer the image correction information. The picture generation unit 310a may correct a to-be-displayed image based on the image correction information and emit image light of the corrected image, so that the virtual image generated by the imaging reflector can match the location of the eye and/or the gaze direction of the user, to improve viewing experience of the user.

Figure 10:
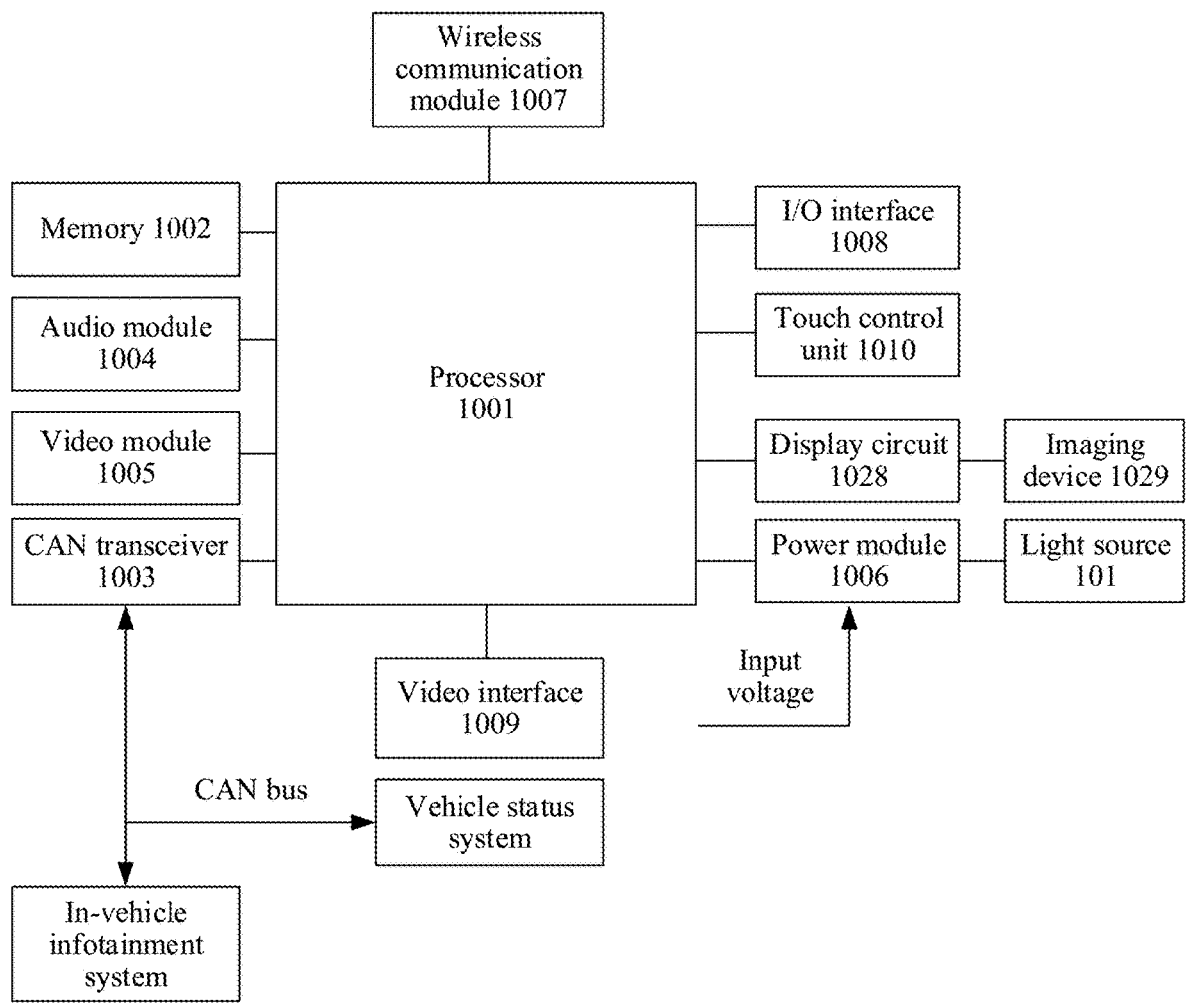
FIG. 10 is a schematic diagram of a circuit of a display apparatus according to an embodiment of this application.

Refer to FIG. 10. FIG. 10 is a schematic diagram of a circuit of a display apparatus according to an embodiment of this application.

As shown in FIG. 10, circuits in the display apparatus mainly include a processor 1001, a memory 1002, a controller area network (CAN) transceiver 1003, an audio module 1004, a video module 1005, a power module 1006, a wireless communication module 1007, an I/O interface 1008, a video interface 1009, a touch control unit 1010, a display circuit 1028, an imaging device 1029, and the like. The processor 1001 may be connected peripheral components, such as the memory 1002, the CAN transceiver 1003, the audio module 1004, the video module 1005, the power module 1006, the wireless communication module 1007, the I/O interface 1008, the video interface 1009, the touch control unit 1010, and the display circuit 1028, by a bus. The processor 1001 may be referred to as a front-end processor.

In addition, the schematic diagram of a circuit in this embodiment of this application does not constitute a specific limitation on the display apparatus. In some other embodiments of this application, the display apparatus may include more or fewer components than those shown in the figure, or some components may be combined, or some components may be divided, or different component arrangements may be used. The illustrated components may be implemented by hardware, software, or a combination of software and hardware.

The processor 1001 includes one or more processing units. For example, the processor 1001 may include an application processor (AP), a modem processor, a graphics processing unit (GPU), an image signal processor (ISP), a controller, a video codec, a digital signal processor (DSP), a baseband processor, and/or a neural-network processing unit (NPU), etc. Different processing units may be separate components, or may be integrated into one or more processors. The processor may implement functions of the processing units 340*a*, 340*b*, 640, 840, and 940.

A memory configured to store instructions and data may be further disposed in the processor 1001. In some embodiments, the memory in the processor 1001 is a cache. The memory may store an instruction or data that is recently used or to be cyclically used by the processor 1001. When needing to use the instruction or the data again, the processor 1001 may directly call the instruction or the data from the memory. This avoids repeated accessing and reduces a wait time for the processor 1001, thereby improving system efficiency. The processor 1001 may also be referred to as a controller.

In some embodiments, the display apparatus may further include a plurality of input/output (I/O) interfaces 1008 connected to the processor 1001. The interfaces 1008 may include but are not limited to an inter-integrated circuit (I2C) interface, an inter-integrated circuit sound (I2S), a pulse code modulation (PCM) interface, a universal asynchronous receiver/transmitter (UART) interface, a mobile industry processor interface (MIPI), a general-purpose input/output (GPIO) interface, a subscriber identity module (SIM) interface, and/or a universal serial bus (USB) interface, and the like. The I/O interface 1008 may be connected to a device such as a mouse, a touchpad, a keyboard, a camera, a speaker/horn, or a microphone, or may be connected to a physical button (such as a volume button, a brightness adjustment button, or a power button) on the display apparatus.

The memory 1002 may include an internal memory, and may further include an external memory (for example, a Micro SD card). The memory 1002 may be configured to store computer-executable program code. The computer-executable program code includes instructions. The memory 1002 may include a program storage area and a data storage area. The program storage area may store an operating system, an application program required by at least one function (such as a call function or a time setting function), and the like. The data storage area may store data (such as a phone book and world time) created during use of the display apparatus, and the like. In addition, the memory 1002 may include a high-speed random access memory, and may further include a non-volatile memory, for example, at least one magnetic disk storage device, a flash memory device, or a universal flash storage (UFS). The processor 1001 executes various function applications and data processing of the display apparatus by running the instructions stored in the memory 1002 and/or the instructions stored in the memory disposed in the processor 1001.

Further, the display apparatus further includes the CAN transceiver 1003, and the CAN transceiver 1003 may be connected to a CAN bus of a vehicle. Through the CAN bus, the display apparatus may communicate with an in-vehicle infotainment system (music, radio, and video modules), a vehicle status system, and the like. For example, a user may turn on an in-vehicle music playing function by operating the display apparatus. The vehicle status system may send vehicle status information (such as a vehicle door or a seat belt) to the display apparatus for display.

The display apparatus may implement an audio function through the audio module 1004, the application processor, and the like. For example, the audio function includes music play, calling, and the like.

The audio module 1004 is configured to convert digital audio information into an analog audio signal for output, and is also configured to convert an analog audio input into a digital audio signal. The audio module 1004 may be further configured to encode and decode an audio signal, for example, perform audio playing or recording. In some embodiments, the audio module 1004 may be disposed in the processor 1001, or some functional modules of the audio module 1004 may be disposed in the processor 1001.

The video interface 1009 may receive input audio and video, and may be specifically a high definition multimedia interface (HDMI), a digital visual interface (DVI), a video graphics array (VGA), a display port (DP), a low voltage differential signaling (LVDS) interface, and the like. The video interface 1009 may further output a video. For example, the display apparatus receives, through the video interface, video data sent by a navigation system.

The video module 1005 may decode the video input through the video interface 1009, for example, perform H.264 decoding. The video module may further encode a video captured by the display apparatus, for example, perform H.264 encoding on a video captured by an external camera. In addition, the processor 1001 may also decode a video input through the video interface 1009, and then output a decoded image signal to the display circuit.

The display circuit 1028 and the imaging device 1029 are configured to display a corresponding image. In this embodiment, the video interface 1009 receives input video data (or referred to as a video source), the video module 1005 performs decoding and/or digital processing of the video data and outputs an image signal to the display circuit 1028, and the display circuit 1028 drives, based on the input image signal, the imaging device 1029 to perform imaging using a light beam emitted by a light source 101, to generate a visible image. For example, the imaging device 1029 generates a source image and emits imaging light. The display circuit 1028 and the imaging device 1029 are electronic components in an imaging module 102, and the display circuit 1028 may be referred to as a drive circuit.

The power module 1006 is configured to supply electric power to the processor 1001 and the light source 101 based on input power (such as a direct current). The power module 1006 may include a rechargeable battery. The rechargeable battery may supply power to the processor 1001 and the light source 101. Light emitted by the light source 101 may propagate to the imaging device 1029 for imaging, to form an image light signal (imaging light).

In addition, the power module 1006 may be connected to a power supply module (such as a power battery) of a vehicle, and the power supply module of the vehicle supplies power to the power module 1006 of the display apparatus.

The wireless communication module 1007 may enable the display apparatus to perform wireless communications with the outside, and may provide wireless communication solutions such as a wireless local area network (WLAN) (such as a wireless fidelity (Wi-Fi) network), Bluetooth (BT), a global navigation satellite system (GNSS), frequency modulation (FM), near field communication (NFC), and infrared (IR). The wireless communication module 1007 may be one or more components integrating at least one communications processor module. The wireless communication module 1007 receives an electromagnetic wave via the antenna, performs frequency modulation and filtering on the electromagnetic wave signal, and sends the processed signal to the processor 1001. The wireless communication module 1007 may further receive a to-be-sent signal from the processor 1001, and perform frequency modulation and amplification on the signal. The amplified signal is converted into an electromagnetic wave and radiated out via the antenna.

In addition, the video data decoded by the video module 1005 may be input through the video interface 1009, received in a wireless manner through the wireless communication module 1007, or read from the memory 1002. For example, the display apparatus may receive video data from a terminal device or an in-vehicle infotainment system through a wireless local area network in a vehicle, and the display apparatus may also read audio and video data stored in the memory 1002.

The touch control unit 1010 may generate a control signal (such as a brightness/contrast adjustment signal) based on a touch control operation performed on a touch control interface by a user, and then send the control signal to the display circuit 1028 through the processor 1001. The display circuit 1028 adjusts imaging of the imaging device 1029 based on the control signal, to change the displayed source image. The touch control interface may include a control button (a volume button, a brightness adjustment button, a contrast adjustment button, and the like).

Figure 11:
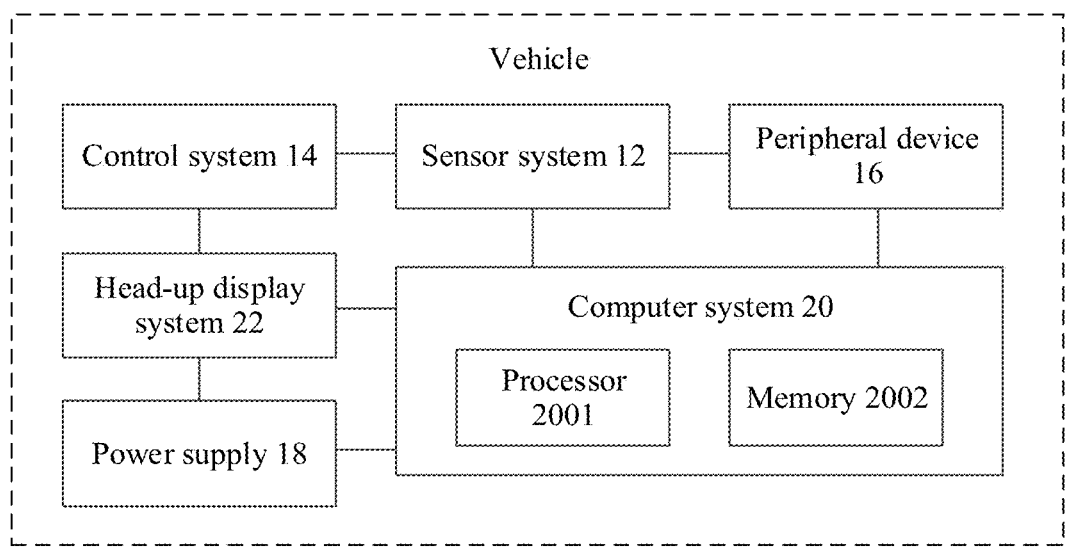
FIG. 11 is a schematic diagram of a possible functional framework of a vehicle according to this application.

Refer to FIG. 11, which is a schematic diagram of a possible functional framework of a vehicle according to this application. In this example, an example in which a display system is a head-up display system is used for description. The functional framework of the vehicle may include various subsystems, for example, a sensor system 12, a control system 14, one or more peripheral devices 16 (one peripheral device is shown in the figure by way of example), a power supply 18, a computer system 20, and a head-up display system 22 in the figure. The subsystems may communicate with each other. Optionally, the vehicle may further include another functional system, for example, an engine system that supplies power to the vehicle, or a cockpit. This is not limited herein in this application.

The sensor system 12 may include several detection devices. These detection devices can sense measured information and convert, according to a rule, the sensed information into an electrical signal or information in another required form for output. As shown in the figure, these detection devices may include a global positioning system (GPS), a vehicle speed sensor, an inertial measurement unit (IMU), a radar unit, a laser rangefinder, a camera apparatus, a wheel speed sensor, a steering sensor, a gear position sensor, another element for automatic detection, or the like. This is not limited in this application.

The control system 14 may include several elements, for example, a steering unit, a braking unit, a lighting system, an autonomous driving system, a map navigation system, a network time synchronization system, and an obstacle avoidance system not shown in the figure. The control system 14 may receive information (such as a vehicle speed or a vehicle distance) sent by the sensor system 12, and implement functions such as autonomous driving and map navigation.

Optionally, the control system 14 may further include elements such as a throttle controller and an engine controller that are configured to control a driving speed of the vehicle. This is not limited in this application.

The peripheral device 16 may include several elements, for example, a communication system, a touchscreen, a user interface, a microphone, and a speaker not shown in the figure. The communication system is configured to implement network communication between the vehicle and a device other than the vehicle. In an actual application, the communication system may implement network communication between the vehicle and another device by using a wireless communication technology or a wired communication technology. The wired communication technology may mean that the vehicle communicates with the another device through a network cable, an optical fiber, or the like.

The power supply 18 represents a system that provides electric power or energy for the vehicle, and may include but is not limited to a rechargeable lithium-ion battery or lead-acid battery, or the like. In an actual application, one or more battery components in the power supply are configured to provide electric power or energy for starting the vehicle. A type and a material of the power supply are not limited in this application.

Several functions of the vehicle are implemented under control of the computer system 20. The computer system 20 may include one or more processors 2001 (one processor is shown in the figure by way of example) and a memory 2002 (which may also be referred to as a storage apparatus). In an actual application, the memory 2002 may be disposed in the computer system 20, or may be disposed outside the computer system 20, for example, as a cache in the vehicle. This is not limited in this application.

The processor 2001 may include one or more general purpose processors, for example, a graphics processing unit (GPU). The processor 2001 may be configured to run a related program stored in the memory 2002 or instructions corresponding to the program, to implement corresponding functions of the vehicle.

The memory 2002 may include a volatile memory, for example, an RAM; or the memory may include a non-volatile memory, for example, a ROM, a flash memory, an HDD, or a solid state disk SSD; or the memory 2002 may further include a combination of the foregoing types of memories. The memory 2002 may be configured to store program code or instructions corresponding to the program code, so that the processor 2001 invokes the program code or the instructions stored in the memory 2002 to implement the corresponding functions of the vehicle. The functions include but are not limited to some or all of the functions in the schematic diagram of the functional framework of the vehicle shown in FIG. 11. In this application, the memory 2002 may store program code for vehicle control, and the processor 2001 may invoke the program code to control the vehicle to drive safely. How to implement safe driving of the vehicle is specifically described in detail below in this application.

Optionally, in addition to storing the program code or the instructions, the memory 2002 may further store information such as a road map, a driving route, and sensor data. The computer system 20 may implement related functions of the vehicle in cooperation with other elements in the schematic diagram of the functional framework of the vehicle, such as a sensor or the GPS in the sensor system. For example, the computer system 20 may control a driving direction, a driving speed, or the like of the vehicle based on a data input of the sensor system 12. This is not limited in this application.

The head-up display system 22 may project an image to a windshield, to present a target image in front of a driver. For a specific structure of the head-up display apparatus, refer to the foregoing embodiments of the display apparatus. Details are not described herein again.

The head-up display system 22 may receive image data sent by the control system 14 or the computer system 20, for example, receive an image that includes a vehicle status such as a vehicle speed or a battery level/fuel level and an image that includes augmented reality AR content. The head-up display system 22 may further receive a control signal from the computer system 20, and enable or disable a head-up display function.

In this application, the framework including four subsystems, namely, the sensor system 12, the control system 14, the computer system 20, and the head-up display system 22, shown in FIG. 11 is merely an example, and does not constitute a limitation. In an actual application, several elements in the vehicle may be combined according to different functions of the vehicle, to obtain subsystems corresponding to the different functions. In an actual application, the vehicle may include more or fewer subsystems or elements. This is not limited in this application.

A curved mirror in embodiments of this application may be a multi-focus free-form curved mirror. The design of the multi-focus free-form curved reflector allows for viewing by a plurality of persons.

The vehicle in embodiments of this application may be a known vehicle such as a vehicle, an airplane, a ship, or a rocket, or may be a vehicle that will be developed in the future. The vehicle may be an electric vehicle, a fuel vehicle, or a hybrid power vehicle, for example, a pure electric vehicle, a range-extended electric vehicle, a hybrid electric vehicle, a fuel cell vehicle, or a new energy vehicle. This is not specifically limited in this application. In addition, the electronic device in embodiments of this application includes a device equipped with the display apparatus, may include the foregoing vehicle, and may also be a medical device, an office entertainment device, or an industrial control device. This is not limited in this embodiment.

The terms "first, second, third, fourth", and the like in this application are intended to distinguish between similar objects, but do not necessarily indicate a particular order or sequence. It should be understood that data termed in such a way are interchangeable in proper cases so that embodiments described herein can be implemented in orders not described in this application. To more clearly reflect a relationship between components in different embodiments, in this application, same reference numerals are used to represent components having same or similar functions in different embodiments.

It should be further noted that, unless otherwise specified, specific descriptions of some technical features in one embodiment may also be used to explain corresponding technical features mentioned in other embodiments.

For same or similar parts in embodiments of this application, refer to each other. The foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. An apparatus, comprising: a picture generation unit, an imaging reflector, a detection unit, and at least one processor, wherein:
the detection unit is deployed on a rear side of the imaging reflector;
the picture generation unit is configured to generate an image, and send image light of the image to the imaging reflector;
the imaging reflector is configured to reflect the image light to generate a virtual image of the image;
the detection unit is configured to collect first signal light transmitted through the imaging reflector, wherein the first signal light is light reflected by an eye of a user viewing the virtual image;
the at least one processor is configured to determine a location of the eye of the user based on the first signal light collected by the detection unit;
a propagation direction of the image light reflected by the imaging reflector is parallel to a propagation direction of the first signal light; and
the imaging reflector is configured to reflect first polarized light and transmit second polarized light, wherein polarization directions of the first polarized light and the second polarized light are perpendicular to each other, the image light is the first polarized light, and the first signal light is the second polarized light.

2. The apparatus according to claim 1, wherein a curvature of a front surface of the imaging reflector is consistent with a curvature of a rear surface of the imaging reflector.

3. The apparatus according to claim 1, wherein a curvature of a front surface of the imaging reflector is inconsistent with a curvature of a rear surface of the imaging reflector.

4. The apparatus according to claim 3, wherein:
the apparatus further comprises a lens, and the lens is deployed between the imaging reflector and the detection unit; and
the lens is configured to perform light compensation on the first signal light transmitted through the imaging reflector, and transmit the first signal light after the light compensation to the detection unit.

5. The apparatus according to claim 1, wherein the detection unit is deployed on a connecting line between an observation location and the virtual image generated by the imaging reflector, and the observation location is the location of the eye of the user viewing the virtual image.

6. The apparatus according to claim 5, wherein the connecting line is perpendicular to the virtual image and passes through a center of the virtual image.

7. The apparatus according to claim 1, wherein:
the at least one processor is further configured to generate image correction information based on the first signal light collected by the detection unit, and send the image correction information to the picture generation unit; and
the picture generation unit is further configured to adjust the generated image based on the image correction information.

8. The apparatus according to claim 1, wherein the imaging reflector is a display window.

9. The apparatus according to claim 1, wherein the image light reflected by the imaging reflector is reflected by a transparent reflector, to form the virtual image of the image.

10. The apparatus according to claim 9, wherein the transparent reflector is a front windshield of a vehicle.

11. The apparatus according to claim 1, wherein the imaging reflector is coated with a polarizing film that is configured to reflect the first polarized light and transmit the second polarized light.

12. A vehicle, comprising a display apparatus, wherein the display apparatus comprises: a picture generation unit, an imaging reflector, a detection unit, and at least one processor, and wherein:

the detection unit is deployed on a rear side of the imaging reflector;

the picture generation unit is configured to generate an image, and send image light of the image to the imaging reflector;

the imaging reflector is configured to reflect the image light to generate a virtual image of the image;

the detection unit is configured to collect first signal light transmitted through the imaging reflector, wherein the first signal light is light reflected by an eye of a user viewing the virtual image;

the at least one processor is configured to determine a location of the eye of the user based on the first signal light collected by the detection unit;

a propagation direction of the image light reflected by the imaging reflector is parallel to a propagation direction of the first signal light; and the imaging reflector is configured to reflect first polarized light and transmit second polarized light, wherein polarization directions of the first polarized light and the second polarized light are perpendicular to each other, the image light is the first polarized light, and the first signal light is the second polarized light.

13. The vehicle according to claim 12, wherein a curvature of a front surface of the imaging reflector is consistent with a curvature of a rear surface of the imaging reflector.

14. The vehicle according to claim 12, wherein a curvature of a front surface of the imaging reflector is inconsistent with a curvature of a rear surface of the imaging reflector.

15. The vehicle according to claim 14, wherein:

the display apparatus further comprises a lens, and the lens is deployed between the imaging reflector and the detection unit; and the lens is configured to perform light compensation on the first signal light transmitted through the imaging reflector, and transmit the first signal light after the light compensation to the detection unit.

16. The vehicle according to claim 12, wherein the detection unit is deployed on a connecting line between an observation location and the virtual image generated by the imaging reflector, and the observation location is the location of the eye of the user viewing the virtual image.

17. The vehicle according to claim 16, wherein the connecting line is perpendicular to the virtual image and passes through a center of the virtual image.

18. The vehicle according to claim 12, wherein:

the at least one processor is further configured to generate image correction information based on the first signal light collected by the detection unit, and send the image correction information to the picture generation unit; and the picture generation unit is further configured to adjust the generated image based on the image correction information.

19. The vehicle according to claim 12, wherein the imaging reflector is a display window.

20. The vehicle according to claim 12, wherein the imaging reflector is coated with a polarizing film that is configured to reflect the first polarized light and transmit the second polarized light.

* * * * *